Figures 1, 2:
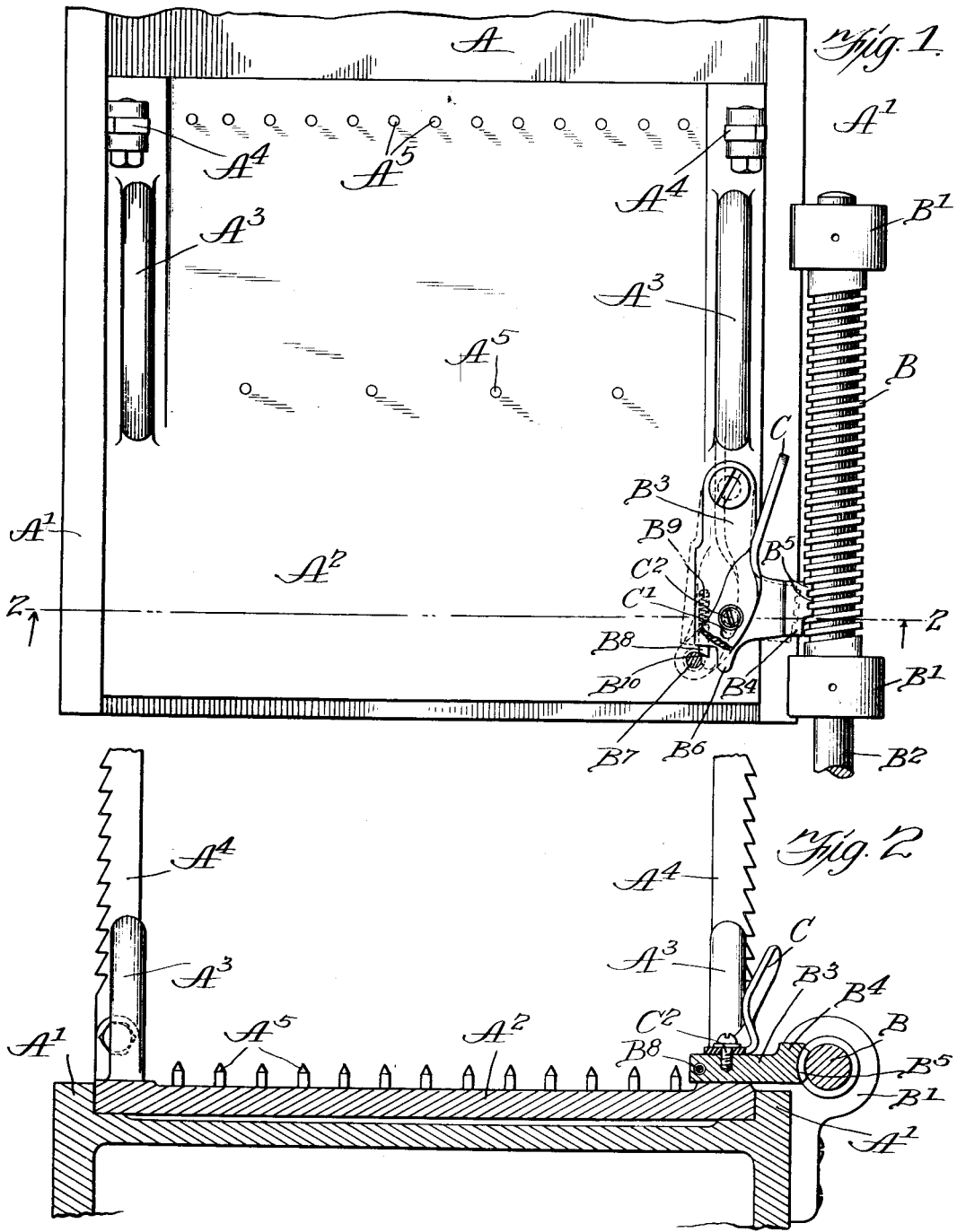

W. B. WOLFF.
GEARING.
APPLICATION FILED MAR. 6, 1911.

1,075,888.

Patented Oct. 14, 1913.

Witnesses:
P. J. Gathmann
Minnie M. Lindenau

Inventor:
Wallace B. Wolff
By Parker & Carter
Attorneys

UNITED STATES PATENT OFFICE.

WALLACE B. WOLFF, OF CHICAGO, ILLINOIS, ASSIGNOR TO AMERICAN SLICING MACHINE COMPANY, OF CHICAGO, ILLINOIS, A CORPORATION OF NEW YORK.

GEARING.

1,075,888.   Specification of Letters Patent.   Patented Oct. 14, 1913.

Application filed March 6, 1911. Serial No. 612,498.

*To all whom it may concern:*

Be it known that I, WALLACE B. WOLFF, a citizen of the United States, residing at Chicago, in the county of Cook and State of Illinois, have invented a certain new and useful Improvement in Gearing, of which the following is a specification.

My invention relates to improvements in adjustable feed nuts for meat slicing machines.

It is illustrated diagrammatically in one form in the accompanying drawing, wherein—

Figure 1 is a part plan view of a meat slicing machine showing the meat carrying platform and feed screw, Fig. 2, a section along the line 2—2 of Fig. 1.

Like parts are indicated by like letters in all figures.

The machine base A is provided with the tracks $A^1$ upon which is slidably mounted the meat platform $A^2$, provided with the upwardly extending elevating handles $A^3$, the toothed uprights $A^4$ and the upwardly projecting meat engaging spikes $A^5$. The feed screw B is carried in the bearings $B^1$ on the frame A and may be rotated by any suitable means not shown, by the shaft $B^2$. The pivotally mounted arm $B^3$ is provided with an extension or nut $B^4$ at right angles thereto, having upon its outer edge the teeth $B^5$ to engage the feed screw B and is provided with the outwardly projecting lug or finger $B^6$ in opposition to the fixed lug $B^7$ on the body of the platform. The slidable pin $B^8$ is forced outwardly by the spring $B^9$ and has a beveled surface $B^{10}$ in opposition to the lug $B^7$ to lock the arm $B^3$ in position. The lever C is pivotally mounted on the top of the lug $B^7$ and contains the curved cam slot $C^1$ in engagement with the screw or pin $C^2$ projecting upwardly from the arm $B^3$.

It will be evident that while I have shown in my drawings an operative device, still many changes might be made in size, shape and arrangement of parts without departing materially from the spirit of my invention and I wish therefore, that my drawings be regarded as in a sense diagrammatic.

The use and operation of my invention are as follows: With the parts in the position shown in full lines in Fig. 1, the feed screw rotates responsive to the transverse motion of the carriage not shown, and draws the meat platform along the frame of the machine, thus feeding the meat on the carriage to the cutting knife. When it is desired to stop the movement of the platform without interrupting the feed screw, or when the platform has reached the end of its excursion, the hand lever is moved backward away from the feed screw drawing with it the arm and carrying the screw engaging nut out of engagement with the screw. The lug projecting from the arm comes in contact with the rigid lug projecting from the platform and the lock bar engages the side of said lug removed from the screw as indicated in the dotted lines to lock the screw engaging nut out of engagement with the screw. The meat carrying platform may then be removed by using the handles in the usual manner or may be moved back to the other end of its excursion without in any way disturbing the nut or the locking mechanism.

I claim:

1. The combination with a feed screw and a carriage parallel therewith and adapted to be driven thereby, of a lever pivotally mounted upon said carriage about an axis at right angles to the axis of the feed screw, provided with a feed nut projecting outwardly from one side thereof and meshing with the feed screw, a stop for said lever to limit its movement away from the feed screw, said lever being also provided with a finger projecting from the end thereof into line with the stop and yielding means projecting outwardly from the end of said lever into engagement with said stop.

2. The combination with a feed screw and a carriage parallel therewith and adapted to be driven thereby, of a lever pivotally mounted upon said carriage about an axis at right angles to the axis of the feed screw, provided with a feed nut projecting outwardly from one side thereof and meshing with the feed screw, a stop for said lever to limit its movement away from the feed screw, said lever being also provided with a finger projecting from the end thereof into line with the stop and yielding means projecting outwardly from the end of said lever into engagement with said stop, a controlling lever pivoted upon said stop and in slidable and rotatable engagement with the end of said feed nut carrying lever.

3. The combination with a feed screw and a carriage parallel therewith and adapted to be driven thereby, of a lever pivotally mounted upon said carriage about an axis at right angles to the axis of the feed screw, provided with a feed nut projecting outwardly from one side thereof and meshing with the feed screw and yielding means for forcing said feed nut into mesh with the feed screw and manually operative means for withdrawing it against the pressure of said yielding means.

WALLACE B. WOLFF.

Witnesses:
 FRANCIS W. PARKER, Jr.,
 SOPHIE B. WERNER.